Figure 1:
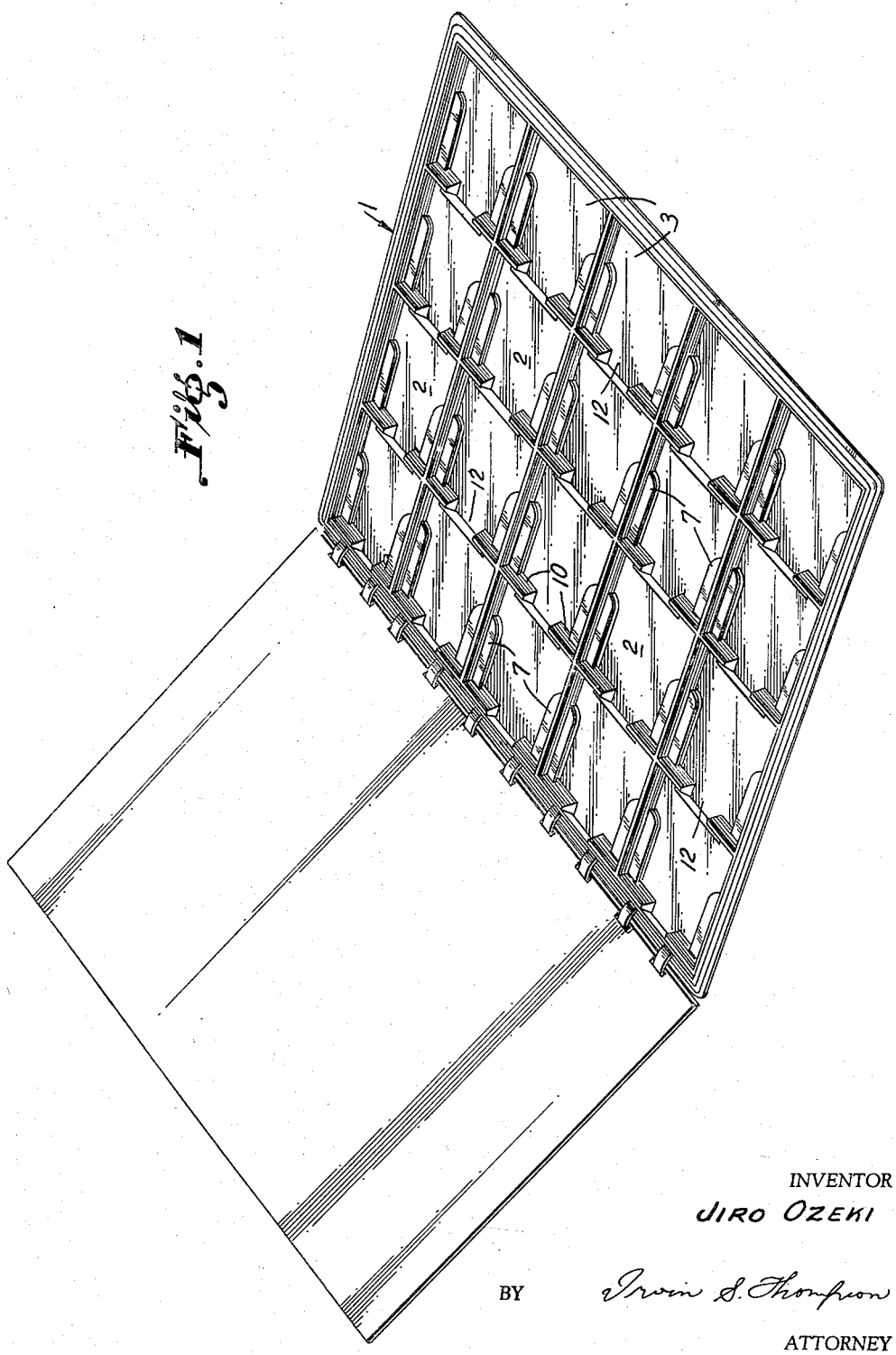

Jan. 24, 1961  JIRO OZEKI  2,968,882
TRANSLUCENT PLATES FOR USE IN FILING COLOR FILM SLIDES
Filed June 9, 1958  2 Sheets-Sheet 1

INVENTOR
JIRO OZEKI
BY
ATTORNEY

Jan. 24, 1961 JIRO OZEKI 2,968,882
TRANSLUCENT PLATES FOR USE IN FILING COLOR FILM SLIDES
Filed June 9, 1958 2 Sheets-Sheet 2
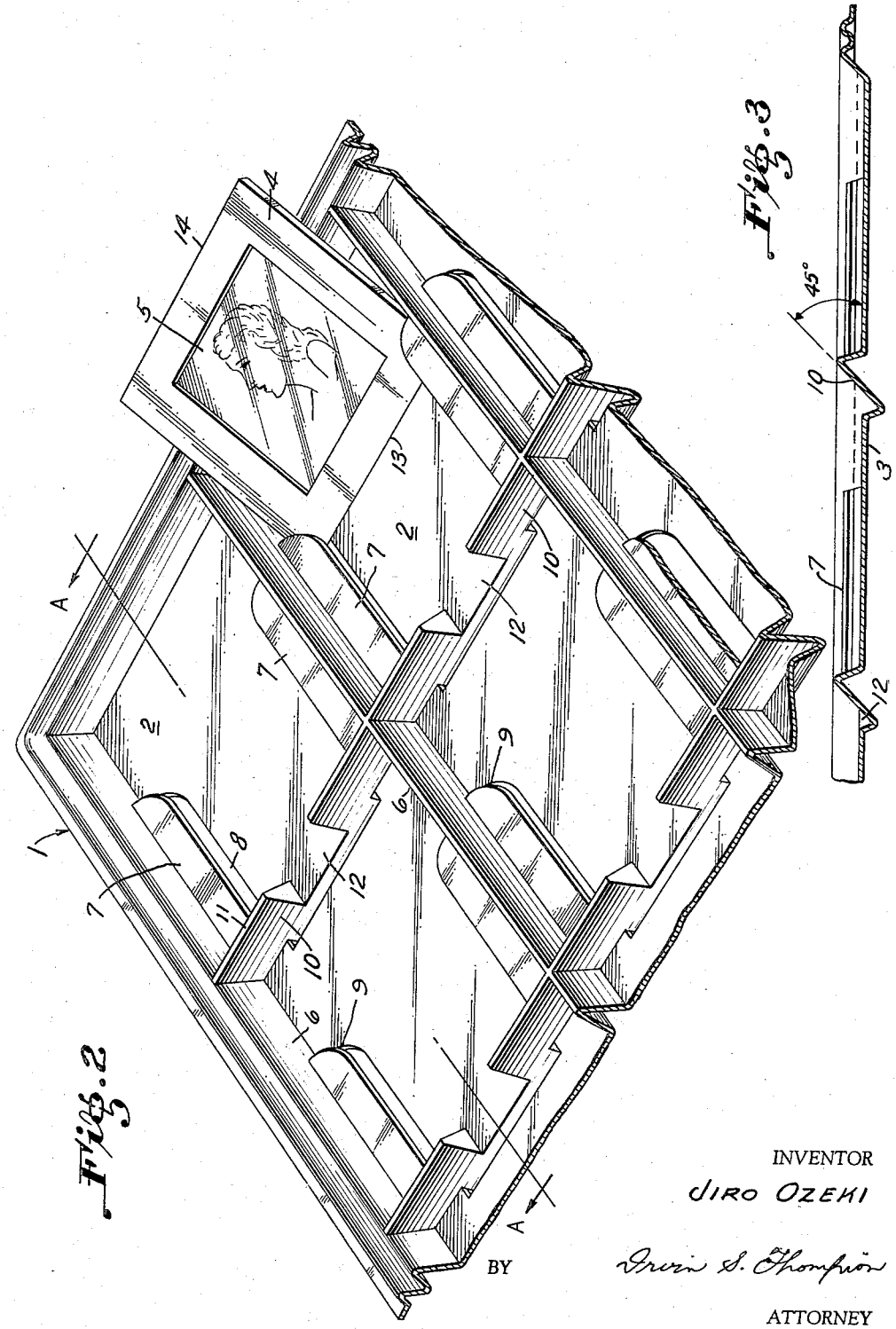
INVENTOR
JIRO OZEKI
BY
ATTORNEY

United States Patent Office 2,968,882
Patented Jan. 24, 1961

2,968,882

TRANSLUCENT PLATES FOR USE IN FILING COLOR FILM SLIDES

Jiro Ozeki, 15 2-Chome, Senkawa-Cho, Tokyo, Japan

Filed June 9, 1958, Ser. No. 740,827

Claims priority, application Japan July 11, 1957

2 Claims. (Cl. 40—106.1)

This invention relates to a translucent plate for use in filing a number of color film slides.

Various kinds of such plates for use in filing a number of color film slides have already been proposed, but these plates have disadvantages that they are not simple in construction and are difficult to manufacture, that the color films could not be discerned by the aid of weak light rays, and that insertion and removal of the slides could not easily and smoothly be effected by means of one finger easily and smoothly be effected by means of one finger tip only.

The object of this invention is to obviate the above disadvantages and provide a new and improved plate for use in filing a number of color films which is simple in construction and easy to manufacture.

In accordance with this invention, the plate comprises a number of rectangular trays each having a base surface made of translucent plastic material and arranged in rows and columns wherein the rear half of each of the opposed side walls is provided with a narrow horizontal projection forming between it and the base surface a space adapted to retain said slide, the front wall is inclined to said base surface facilitating insertion and removal of said slide, and the rear wall is cut off at its center to form a depression adapted to receive a finger tip.

Reference is taken to the accompanying drawing for a better understanding of the present invention when considered in connection with the following detailed description, in which Fig. 1 is a perspective view of a translucent plate showing an embodiment of this invention;

Fig. 2 is a similar view to Fig. 1 showing a part of the plate with a color film slide inserted therein in an enlarged scale, and Fig. 3 is a sectional view through the line A—A of Fig. 2.

Referring to Figs. 1 to 3 of the drawing, 1 designates a plate made of a translucent plastic material such that it is not opaque but translucent so as to diffuse light rays without effecting pin hole effect. The plate 1 comprises a number of rectangular trays 2 arranged in rows and columns.

The area of the base surface 3 of each tray 2 is determined such that it can contain a slide 4 having a color film 5 inserted therein. The translucency of the base surface 3 serves to discern the color film 5 by weak light rays.

Each rectangular tray 2 is enclosed by four walls of which opposed side walls 6, 6 are provided along the rear half thereof with narrow horizontal projections 7, 7. These projections 7, 7 are formed by cutting off longitudinal slots 8, 8 out of the base surface 3 and by pressing upwards. The spaces thus formed between the projections 7, 7 and the base surface 3 are adapted to be easily engaged by the slide 4, so that the upper ends 9, 9 of these projections 7, 7 are made rounded.

The front wall 10 of each tray 2 is inclined to the base surface 3. This inclined angle is dependent upon many factors such as friction factor of the material of the tray 2, thickness of the material etc., but 45° is preferable as shown in Fig. 3. The inclined front wall 10 facilitates easy insertion and removal of the slide 4 without involuntarily slipping out of the tray 2.

The rear wall 11 is cut off at its center to form a depression 12. One finger tip (not shown) can be inserted in the depression 12 thus formed, and the bottom end 13 of the slide 4 can be pushed forwards so as to slip the front end 14 of the slide 4 over the inclined front wall 10 and remove it out of the tray 2.

If it is desired to insert the slide 4 into the tray 2, the bottom end 13 of the slide 4 is inserted in the space formed between the projection 7 and the base surface 3 and pushed rearwards until the slide 4 rests on the base surface 3 to enclose the slide 4 in the tray 2.

The color film slide 4 thus enclosed in a number of trays 2 of the plate 1 could not involuntarily slip out of the plate 1 owing to the inclined front wall 10, and the color films 5 may be clearly discerned by weak light days owing to the diffusion effect of the translucent base surface 3.

The slide 4 enclosed in the tray 2, if desired, could easily be taken out of the plate 1 with a single operation by inserting one finger tip into the depression 12 and pushing the slide 4 forwards, without necessitating two fingers and troublesome operations.

All of the trays 2 having the above constructional features can be made integrally with the plate 1 itself by a press molding process etc., thereby simplifying its process of manufacture. Since each plate 1 made of plastic material can be made very thin, a number of these plates 1 could be bound together to form an album.

What I claim is:

1. A self-supporting unitary plate for holding and viewing photographic slides comprising a sheet of translucent plastic material having a number of rectangular depressions therein spaced apart in lateral and longitudinal relationship, each of said depressions being adapted to hold a photographic slide, each depression having a substantially flat bottom and being surrounded by two side walls and a first and a second end wall, each of said side walls having a projection thereon adjacent the second end wall in parallel spaced relation to said flat bottom, said projections and said second end wall providing a retaining means for a slide, said first end wall being inclined to said flat bottom to facilitate insertion and removal of a slide, and said second end wall being provided with an intermediate opening to allow a fingertip to be inserted therein to remove a slide from the retaining means.

2. An album for photographic slides, which comprises single press formed plates of translucent plastic material, each plate having formed therein a number of rectangular trays arranged in parallel rows and in multiple columns for receiving the slides, each tray having a base and being provided with narrow horizontal projections on both sides for a certain length spaced from the base surface and a projecting wall having one surface substantially perpendicular to said base and projections, said base, projections and one surface forming a retaining means for said slide, said projecting wall having a further surface inclined to the base to facilitate insertion and removal of said slide, and said projecting wall being cut off at its center to form a depression to pass a fingertip to remove a slide from said retaining means.

References Cited in the file of this patent

UNITED STATES PATENTS

| | | |
|---|---|---|
| 2,779,116 | Smith | Jan. 29, 1957 |
| 2,816,379 | Ensor | Dec. 17, 1957 |
| 2,821,037 | Westphal | Jan. 28, 1958 |